United States Patent [19]
Gourdol

[11] Patent Number: 5,590,219
[45] Date of Patent: Dec. 31, 1996

[54] METHOD AND APPARATUS FOR RECOGNIZING GESTURES ON A COMPUTER SYSTEM

[75] Inventor: Arnaud P. J. Gourdol, Cupertino, Calif.

[73] Assignee: Apple Computer, Inc., Cupertino, Calif.

[21] Appl. No.: 405,542

[22] Filed: Mar. 16, 1995

Related U.S. Application Data

[63] Continuation of Ser. No. 130,074, Sep. 30, 1993.

[51] Int. Cl.$^6$ ...................................................... G06K 9/46
[52] U.S. Cl. .......................... 382/202; 382/187; 382/203
[58] Field of Search ..................................... 382/187, 202, 382/203, 201, 188, 189; 395/146, 155; 345/156, 173, 179

[56] References Cited

U.S. PATENT DOCUMENTS

| | | | |
|---|---|---|---|
| 4,365,235 | 12/1982 | Greanias et al. | 340/146.3 |
| 4,680,804 | 7/1987 | Kuzunuki et al. | 382/13 |
| 4,739,317 | 4/1988 | Berry et al. | 340/723 |
| 4,812,832 | 3/1989 | Oishi et al. | 340/709 |
| 4,821,030 | 4/1989 | Batson et al. | 340/712 |
| 4,992,630 | 2/1991 | Mletzko | 178/18 |
| 5,034,989 | 7/1991 | Loh | 382/13 |
| 5,038,382 | 8/1991 | Lipscomb | 382/13 |
| 5,063,600 | 11/1991 | Norwood | 382/13 |
| 5,121,442 | 6/1992 | Togawa et al. | 382/13 |
| 5,157,737 | 10/1992 | Sklarew | 382/13 |
| 5,218,645 | 6/1993 | Bacus | 382/6 |
| 5,220,649 | 6/1993 | Forcier | 395/148 |
| 5,252,951 | 10/1993 | Tannenbaum et al. | 345/173 |
| 5,481,278 | 1/1996 | Shigematsu et al. | 345/179 |

FOREIGN PATENT DOCUMENTS

0383304A2  8/1990  European Pat. Off. ....... G06K 11/12

OTHER PUBLICATIONS

Valdes, Ray, DDJ Handprinting Recognition Context Wrap-up Dr. Dobb s Journal, Jan. 1993.

Using Penpoint Developer Release Operators Manual for PenPoint Operating System, by Go Corporation, Foster City, CA.

Primary Examiner—Jose L. Couso
Assistant Examiner—Bhavesh Mehta
Attorney, Agent, or Firm—Hickman Beyer & Weaver

[57] ABSTRACT

A method and apparatus for recognizing an ellipse-type gesture input on a display screen of a computer system. A stroke is input by a user onto a computer screen, and the stroke is smoothed by reducing the number of points that represent the stroke. It is determined whether the smoothed stroke includes at least a predetermined minimum number of points, and, if so, angles between adjacent segments of the smoothed stroke and derivatives of the angles are calculated. It is determined if the stroke substantially represents an ellipse by checking if the stroke curves in one direction or more than one direction utilizing the angles and the derivatives of the angles. In addition, the stroke represents an ellipse if the end points are within a predetermined distance of each other, and if a sum of the derivatives of the angles is within a predetermined range of values. The method preferably includes selecting an object on the screen if the object is substantially overlapped by the smoothed stroke. An alternative embodiment includes determining whether the stroke is part of a multiple stroke gesture, and, if so, adding the stroke to stroke portions previously input by the user.

27 Claims, 13 Drawing Sheets

METHOD AND APPARATUS FOR RECOGNIZING GESTURES ON A COMPUTER SYSTEM

This is a continuation of copending application Ser. No. 08/130,074 filed on Sep. 30, 1993.

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware ("pen") computer system. A pen-based computer system is typically a small, hand-held computer where the primary method for inputting data includes a "pen" or stylus. A pen-aware computer system is one which has been modified to accept pen inputs in addition to traditional input methods. A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. A stroke can be defined as the engagement of the screen with a stylus, the movement of the stylus across the screen (if any), and its subsequent disengagement from the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen-based computers can provide a number of useful functions, such as serving as an address book, an appointment calendar, a to-do list, etc.

A common feature of pen computers is the use of "gestures". Gestures are symbols entered on a screen of a pen computer by a pointing device that perform a specific function or command for the user. Gestures are entered on the screen by a user, recognized by the computer, and the corresponding function or command is then implemented. For example, a jagged line can be implemented as a "scrub" gesture. A user writes a jagged line over a preexisting object displayed on the screen. The computer recognizes the jagged line as a scrub gesture and implements the function of the gesture, which is to delete all objects which the scrub gesture overlays. Other gestures can include arrows or lines to change lowercase text to uppercase text (or vice versa), and a carat to insert text within a text object.

Gesture recognition of the prior art, however, does not address certain issues. The method used to recognize gestures in the prior art can be inefficient or sometimes unreliable. If a user enters a gesture that does not look very similar to the standardized gesture shape, then the gesture will not be recognized. What is needed is an efficient and reliable gesture recognizer that is more personalized to the user's handwriting.

SUMMARY OF THE INVENTION

The method and apparatus of the present invention provides a gesture recognition process which is particularly well adapted to the pen computer environment.

In a first method aspect of the invention, a stroke input by a user to the computer screen is smoothed by reducing the number of points that represent the stroke. It is then determined whether the smoothed stroke includes at least a predetermined minimum number of points. If so, the angles between adjacent segments of the smoothed stroke as well as their derivatives are calculated. The angles and the derivatives of the angles are used to determine whether the stroke substantially represents an ellipse.

The method preferably includes smoothing the stroke by calculating a position for a new point that is positioned between two adjacent points in the stroke that are separated by less than the threshold distance and replacing the two adjacent points with the new point. These steps are preferably repeated until all of the remaining points in the stroke are separated by at least the threshold distance. The method also preferably includes checking if points in a portion of the stroke are close enough to the opposite end point of the stroke; determining whether said stroke curves substantially in a single direction, and summing the derivatives of the angles and checking if said sum is within a predetermined range of values. If any one of these checks is false, then the stroke is not considered to be an ellipse gesture. The method also preferably includes selecting the ink object when the ink object is substantially overlapped by the smoothed stroke and the smoothed stroke substantially represents an ellipse. In an alternative embodiment, the method includes a step of determining whether the inputted stroke is part of a multiple stroke gesture, and, if so, adding the inputted stroke to stroke portions previously input by the user.

A computer system in accordance with the present invention includes a central processing unit (CPU), a screen coupled to the CPU, and a pointer device coupled to the CPU to provide user inputs which can be displayed on the screen. The apparatus further includes a mechanism for receiving a stroke input by a user onto the screen means by the pointer means, a mechanism for smoothing the stroke by reducing the number of points that represent the stroke, a mechanism for determining whether the smoothed stroke includes at least a predetermined minimum number of points, a mechanism for calculating angles and their derivatives between adjacent segments of the smoothed stroke, and a mechanism for determining whether said stroke substantially represents an ellipse utilizing said angles and said derivatives of said angles.

In a second method aspect of the invention, a stroke input by a user to the computer screen is processed to smooth the stroke. The smoothed stroke is then normalized and stored in a buffer. The normalized stroke is checked if it matches one of a plurality of gesture prototypes. When at least one gesture prototype matches the normalized stroke, the gesture represented by the best matched gesture prototype is selected to represent the stroke. The smoothing step preferably includes reducing a number of points that define said stroke. The normalizing step preferably includes substeps of subtracting an offset value from each coordinate of selected points of the smoothed stroke, dividing each coordinate by a scaling factor, and storing the normalized coordinates in at least one prototype buffer. A plurality of scores are preferably calculated, each score indicating the correspondence of the normalized stroke to an associated one of the gesture prototypes. The gesture prototype having the highest of the calculated scores is preferably selected to represent the stroke if the highest score is above a predetermined threshold value. The gesture prototypes preferably include standard gestures, such as an open bracket gesture, a close bracket gesture, and a pigtail gesture; and they also preferably include gestures input by a user, each gesture representing one of said standard gestures. An alternative embodiment includes a step of determining whether the stroke is part of a multiple stroke gesture, and, if so, adding the stroke to stroke portions previously input by the user.

A computer system in accordance with the second method of the present invention includes a central processing unit (CPU), a screen coupled to the CPU, and a pointer device coupled to the CPU to provide user inputs which can be displayed on the screen. The computer system further includes a processing mechanism for smoothing a stroke entered by the user on the screen, a mechanism for normalizing the smoothed stroke, a mechanism for determining whether the normalized stroke matches one of a number of gesture prototypes, a mechanism for selecting the gesture represented by a best matched gesture prototype as the appropriate interpretation of the stroke, and a mechanism for implementing the selected gesture.

The present invention provides reliable recognition of user-inputted gestures. In addition, the user can input personalized forms of the gestures to permit easier and more reliable recognition. These and other advantages of the present invention will become apparent upon a reading of the following descriptions and a study of the various figures of the drawing.

DETAILED DESCRIPTION OF THE PREFERRED EMBODIMENTS

The present invention is well suited for pointer based computer systems such as the pen-based, pen-aware and mouse-based systems that are currently popular. For the purposes of illustration, the invention will be described in connection with a pen-based or pen-aware ("pen") system.

Figure 1:
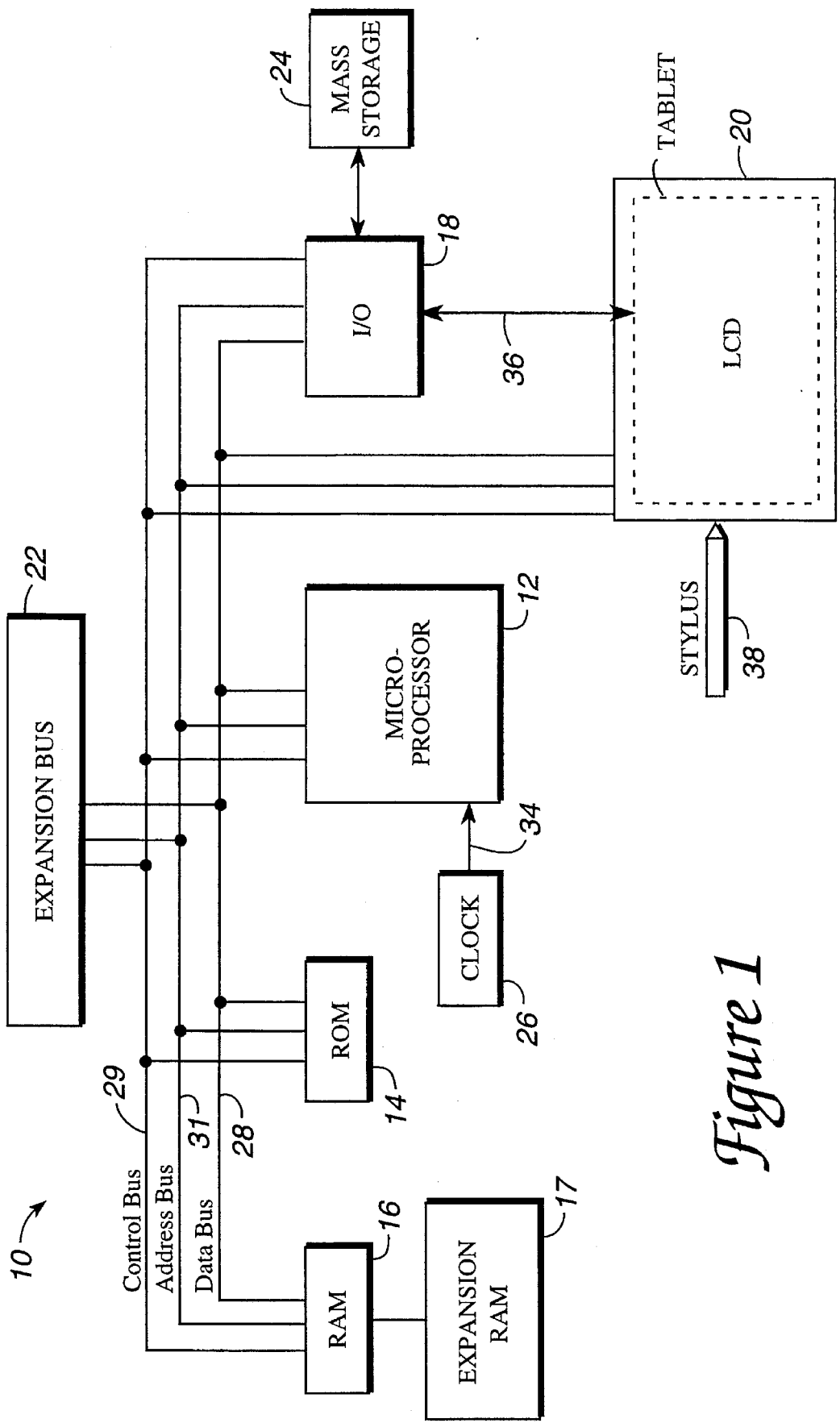
FIG. 1 is a block diagram of a pen computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 can be a thin, clear membrane which covers the LCD display and which is sensitive to the position of a stylus 38 on its surface.

Alternatively, the screens can be provided with an embedded RF digitizer and an "active" RF stylus. There are also other types of confirmation screen/tablet technologies. Combination display assemblies such as display assembly 20 are available frown a variety of vendors.

Other types of user inputs can also be used in conjunction with the present invention. While the method of the present invention is described in the context of a pen system, other pointing devices such as a computer mouse, a track ball, or a tablet can be used to manipulate a pointer on a screen of a general purpose computer. Therefore, as used herein, the terms "pointer", "pointing device" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 could be provided with a backup battery to prevent the loss of data even when the pen computer system 10 is turned off. However, it is generally desirable to have some type of long term storage 24 such as a commercially available miniature hard disk drive, non-volatile memory such as flash memory, battery backed RAM, PC-data cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 2A:
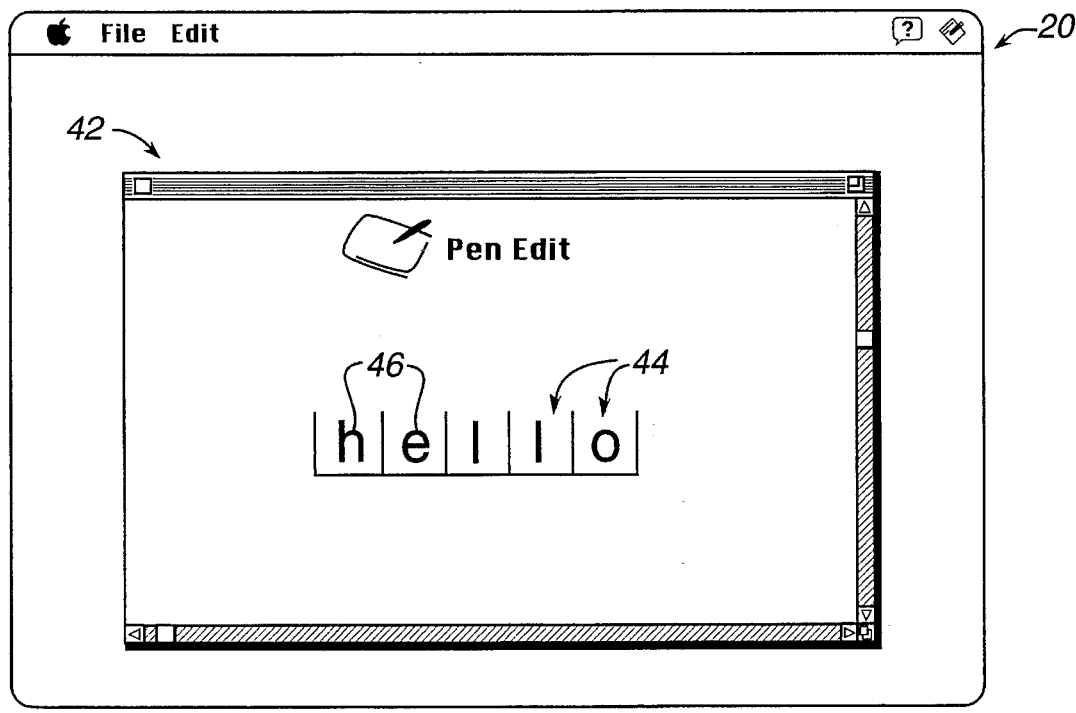
FIG. 2a is a portion of a display screen of the computer system of FIG. 1 showing text characters written into a recognition area.

In FIG. 2a, a portion of a display screen 20 of a computer system is shown. In the preferred embodiment, screen 20 is the LCD input/output display of the pen computer system shown in FIG. 1. A display from an Apple Macintosh System 7.0 operating system environment is shown as an example; however, any graphical user interface (GUI) used on a computer capable of running such an environment is applicable to the present invention.

Window 42 is displayed by a currently active application program. In the described embodiment, window 42 is displayed by a pen handwriting editor program that lets a user edit handwritten words, individual characters, or other displayed objects. Boxes 44 are displayed, each box 44 holding a character 46. Characters 46 are "ink" objects that have been entered by the user, preferably with a pointing device. The user can change or add letters by writing ink in the boxes. For example, using a pointing device, a user could write a character "j" over the character "h" to change the letter. Recognition software would recognize the "j" and replace the "h" with the "j". In the example of FIG. 2a, each character is displayed in its own box 44, where each box limits the field of recognition for each corresponding character.

Characters 46 typically have invisible surrounding borders that are known as bounding boxes. A character's bounding box conforms generally to the shape of the character. For example, a "1" character has a thin, rectangular bounding box encompassing the "1", while a "2" character has a roughly square-shaped bounding box surrounding the character.

Figure 2B:
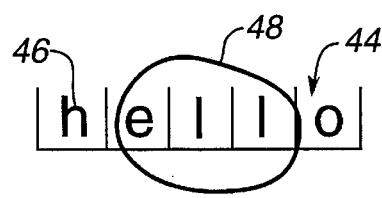
FIG. 2b is a portion of a display screen as shown in FIG. 2a showing an circle selection gesture of the present invention.

In FIG. 2b, a stroke 48 has been entered on the computer screen 20 by the user. In the example shown, the stroke is roughly in the shape of an ellipse that has been drawn to encircle the characters "e", "1", and "1". Stroke 48 is similar to characters 46 in that it is preferably displayed on screen 20 as "ink" that has been drawn by the user using a pointing device. Typically, stroke 48 and characters 46 are written by contacting a stylus to the screen 20 and moving the stylus in a desired direction. The CPU 12 displays the ink along the path of the stylus as the stylus is moved. The stylus is then removed from the screen 20. In the preferred embodiment, when the user lifts the stylus from screen 20 and does not contact the screen for a predetermined period of time, the CPU 12 assumes that the user has finished entering strokes. The stroke(s) that the user entered are then recognized by the CPU as ink objects.

In an alternate embodiment, stroke 48 and characters 46 are written using a stylus on a separate tablet in place of the screen. The tablet acts as the screen for written inputs in such an embodiment. In a different embodiment, stroke 48 and characters 46 are written using a mouse or trackball pointing device. The ink strokes are drawn by pressing a button on the mouse or track ball and releasing the button to display an arrow or other indicator indicating where the mouse or track ball is currently pointing.

In the preferred embodiment, CPU 12 checks if stroke 48 is a predefined gesture. Gestures include distinctive shapes or symbols that are recognized as a predefined character or a command. For example, a particular shape, when recognized, can instruct the CPU 12 to print a preprogrammed word, or delete a specific character. In the described embodiment of FIG. 2b, a circle, ellipse, or other "circle-type" shape that is substantially the shape of an ellipse is recognized by the CPU as a selection gesture. That is, any ink objects, such as characters 46 in FIG. 2b, which are substantially enclosed by the ellipse are selected by the CPU. Herein, "selected" refers to the mode in which a specific ink object can be manipulated by commands issued by the user. For example, an ink object that is selected can be deleted, moved to a different location on the screen, replaced with a different ink object, etc. In FIG. 2b, the characters "e", "1", and "1" are selected by the stroke 48, since the stroke is determined by the CPU to represent a circle-type selection gesture that encloses the characters.

If stroke 48 is not recognized as a circle-type gesture by the CPU, the CPU preferably implements a "fuzzy recognition" process to determine if the stroke matches any other predefined gestures. Herein, the term "fuzzy recognition" refers to the process of recognizing strokes using fuzzy logic, i.e. matching the stroke to a gesture in memory that best matches the stroke. The process of matching the stroke to a predefined gesture is described below.

Figure 2C:
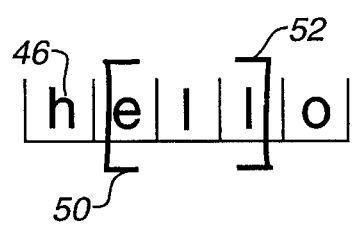
FIG. 2c is a portion of a display screen showing open bracket and close bracket selection gestures of the present invention.

In FIG. 2c, characters 46 are displayed in bounding boxes 44. Open bracket 50 and closed bracket 52 are entered by the user, preferably with a pointing device. The CPU 12 examines the brackets 50 and 52 preferably using a fuzzy recognition process, which is described in detail with reference to FIG. 3. The CPU calculates a correlation between the entered stroke 48 and each one of a list of gesture prototypes. The gesture prototype that best matches stroke 48 is selected by the CPU to represent the stroke.

Figure 2D:
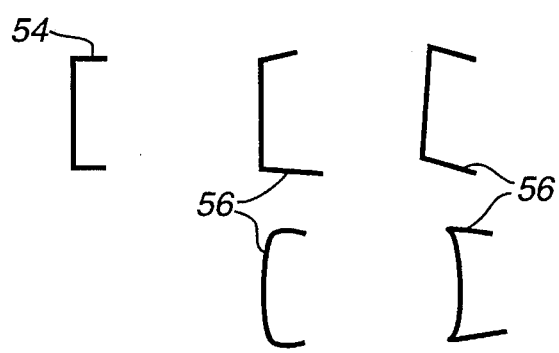
FIG. 2d is a list of standard and user-inputted bracket gesture prototypes.

The standard gesture prototypes in memory include an open bracket 50 and a closed bracket 52 as shown in FIG. 2c. The gesture prototypes also preferably include user-specified gesture prototypes that are similar in shape to brackets 50 and 52 but are closer to the user's personal handwriting. For example, FIG. 2d shows a standard gesture prototype 54 for open bracket 50. Also shown are several gesture prototypes 56 that have been entered by the user to represent an open bracket. If a stroke 48 entered by a user does not match the standard prototype 54, it may more closely match one of the personalized prototypes 56. If a stroke is recognized as a personalized prototype 56, the stroke will be interpreted as an open bracket gesture.

Once the brackets 50 and 52 are recognized, the CPU selects any ink objects between the brackets. In the example of FIG. 2c, the characters "e", "1", and "1" are selected. Selected ink objects can be manipulated as described with reference to FIG. 2b.

Figure 2E:
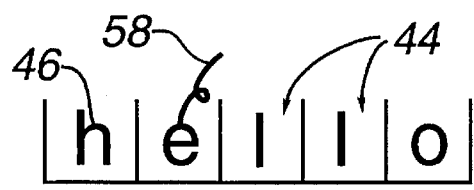
FIG. 2e is a portion of a display screen showing a pigtail gesture of the present invention.
Figure 2F:
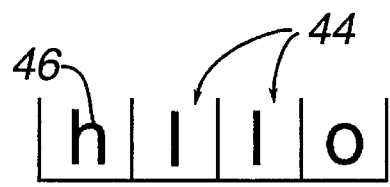
FIG. 2f is a portion of a display screen showing a character deleted by the pigtail gesture of FIG. 2d.

In FIG. 2e, characters 46 are displayed in bounding boxes 48. Stroke 44 is entered by the user in the shape of a pigtail gesture 58, preferably with a pointing device. The CPU examines gesture 58 and, once it is recognized, deletes any ink object overlapping the pigtail stroke. In the example of FIG. 2e, the "e" character would be deleted. This is shown in FIG. 2f. Alternatively, only ink objects that are overlapped by one end of the pigtail gesture could be deleted, and any other ink objects overlapped by different parts of the pigtail would not be affected. In the preferred embodiment, a user can enter personalized gesture prototypes for the pigtail gesture in a similar fashion to the personalized gesture prototypes described with reference to the bracket gestures of FIGS. 2c and 2d.

Figure 3:
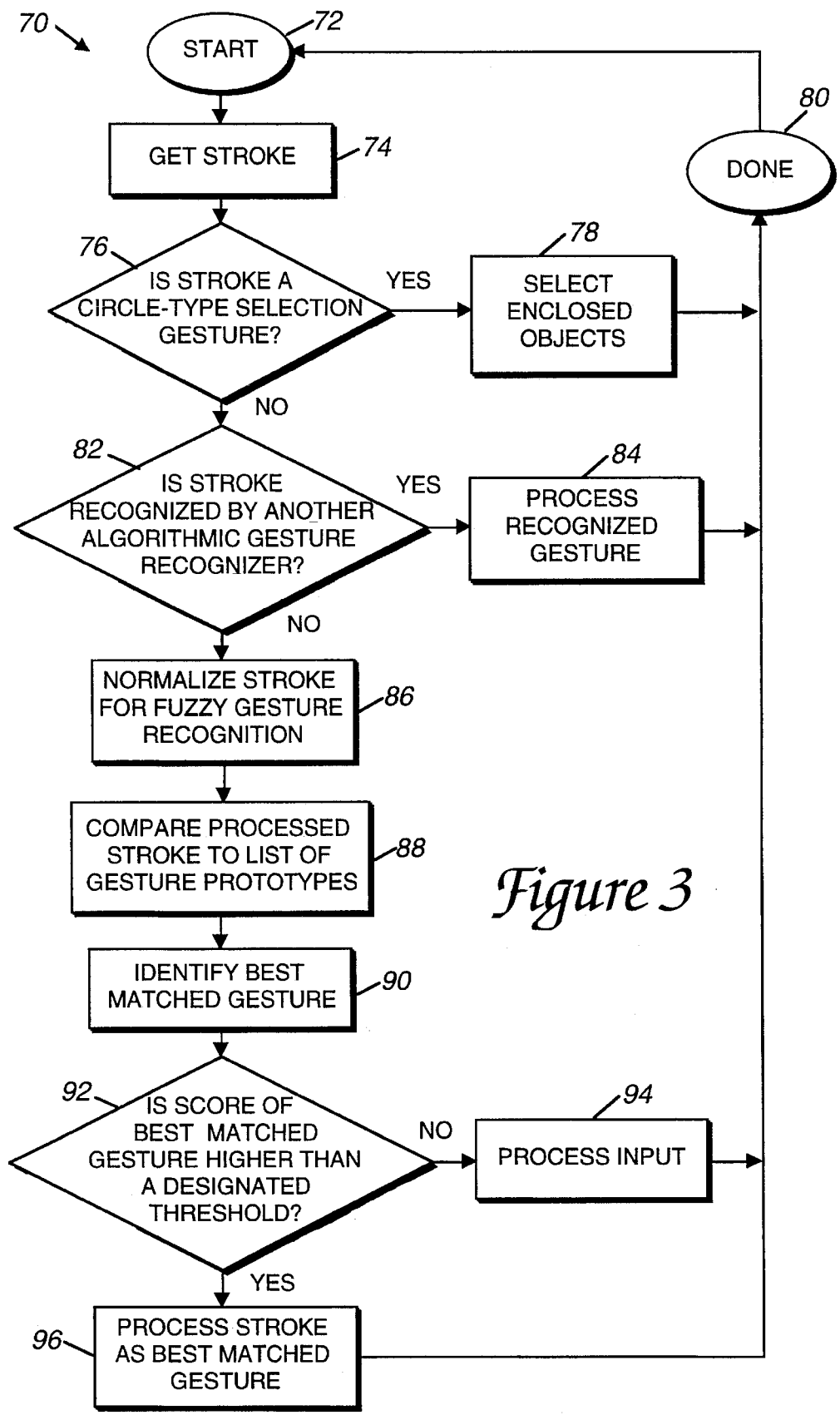
FIG. 3 is a flow diagram illustrating a method of recognizing gestures in accordance with the present invention.

FIG. 3 is a flow diagram 70 of a preferred computer-implemented process in accordance with the present invention. The process begins at step 72, and, in step 74, the CPU receives a stroke 48 entered by the user. The stroke is preferably entered on the screen with a pointing device, such as a stylus. In step 76, the CPU checks if stroke 48 is a circle-type selection gesture. The process for accomplishing step 76 is detailed with reference to FIG. 4. If the CPU finds that stroke 48 is a circle-type selection gesture, step 78 is initiated, in which ink objects enclosed or substantially overlapped by the circle-type gesture are selected by the CPU 12. The process is then complete as indicated in step 80.

If the CPU finds that stroke 48 is not a circle-type selection gesture in step 76, the process continues at step. 82. In step 82, the CPU checks if stroke 48 is recognized by another algorithmic gesture recognizer. The CPU sends the stroke data to any other resident gesture recognizers that use algorithms to recognize strokes entered by the user. An example of a different algorithmic recognizer for a scrub gesture can be found in co-pending patent application Ser. No. 08/070,094, entitled, "Method for Deleting Objects on a Computer Display", by Capps et al. and filed on May, 27 1993, and is hereby incorporated by reference herein. If an algorithmic gesture recognizer recognizes the stroke, then the process continues at step 84, where the recognized gesture is processed according to the gesture recognizer that recognized it, and the process is complete at step 80.

If stroke 48 is not recognized by an algorithmic gesture recognizer in step 82, the process continues at step 86. In step 86, the fuzzy recognition process is begun. The smoothed stroke that was used to check if the stroke was a circle-type selection gesture is normalized and stored in a prototype buffer. Step 86 is described in detail with reference to FIG. 8. In next step 88, the nornmalized stroke is compared to a list of gesture prototypes that are stored in memory. A correlation "score" is calculated between each gesture prototype and the normalized stroke. Step 88 is described in detail with reference to FIG. 9. In next step 90, the CPU identifies the gesture from the list of gesture prototypes that best matches the normalized stroke. This is accomplished by selecting the highest correlation "score" that was calculated between a gesture prototype and the stroke. The gesture prototype that provided the highest score represents the best matched gesture. The gesture prototypes can be prioritized, so that if there is a tie of highest scores, one gesture prototype is chosen as the best match. Alternatively, if two gesture prototypes representing different gestures are tied for the highest score, then the CPU can declare that no match has been found. For example, if two gesture prototypes, both representing an open bracket gesture, have the highest score, then a match to the open bracket gesture results. However, if a gesture prototype representing an open bracket gesture and a gesture prototype representing a closed bracket gesture are tied for the highest score, then the CPU either picks one of the gestures with the higher priority, or the CPU declares that no match has been found. In step 92, the CPU checks if the highest score is higher than a designated threshold. If the score is lower than the threshold, then the process continues at step 94, where the stroke is assumed to not be a gesture and is processed as some other type of input by different recognition or processing software of the computer system. The process is then complete as indicated in step 80.

If the highest score is determined to be above the threshold value in step 92, then the process continues at step 96. In step 96, normalized stroke 48 is processed and implemented as the best matched gesture; if the stroke 48 was best matched to an open or closed bracket, then ink objects between the brackets are selected, or if the stroke was best matched as a pigtail gesture, then specific ink objects are deleted. The process is then complete as indicated in step 80.

Figure 4:
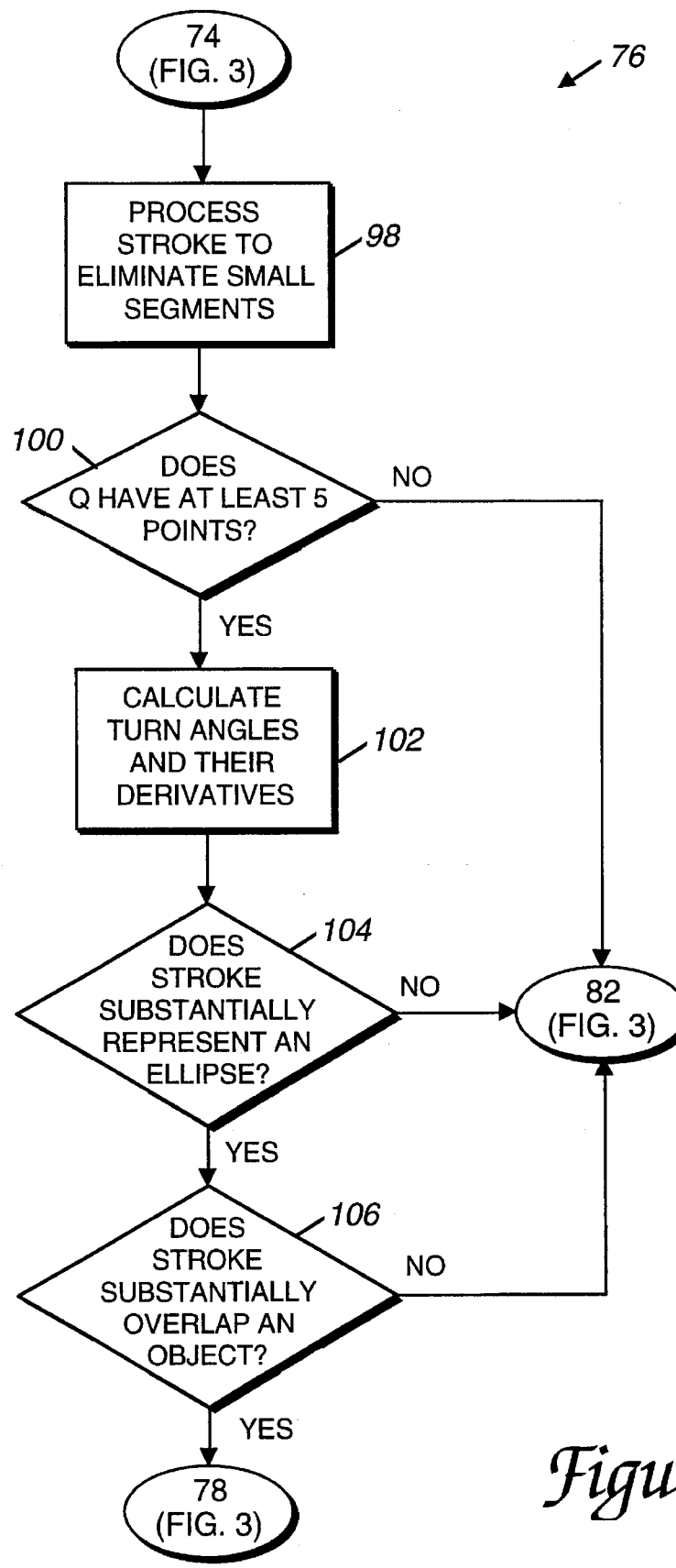
FIG. 4 is a flow diagram illustrating the process of recognizing the circle-type selection gesture of the present invention.

FIG. 4 is a flow diagram 76 illustrating the "Is Stroke a Circle-type Selection Gesture?" step of FIG. 3. In a step 98, stroke 48 is processed to eliminate the small segments of the stroke, i.e. the stroke is "smoothed". This step is detailed further with respect to FIG. 5. Once the stroke is smoothed, step 100 is initiated, in which the CPU preferably checks if the smoothed stroke point array Q includes at least the minimum number of points, which is preferably five. In alternate embodiments, the minimum number of points included in Q can preferably range from 3 to 10. If Q does not include the minimum number of points, then the stroke 48 is assumed not to be a circle-type selection gesture, and the process continues to step 82 of FIG. 3.

If the array Q includes at least the minimum number of points, then the process continues at step 102, in which the CPU calculates the turn angles and the derivatives of the turn angles of the segments of the stroke. This step is described in more detail with reference to FIG. 6. In the next step 104, the CPU checks if the stroke substantially represents an ellipse using the turn angles and derivatives calculated in step 102. Step 104 is described in more detail with reference to FIG. 7. If the stroke does not substantially represent an ellipse, the process continues to step 82 of FIG. 3, where the stroke is checked by the CPU to determine if it is another gesture.

If the stroke does substantially represent an ellipse in step 104, the process continues to step 106, where the CPU checks if the stroke substantially overlaps an object displayed on the screen. This is accomplished preferably by checking the percentage area of the ink object(s) that the bounding box of the stroke overlaps. The bounding box of the stroke is a rectangular box that fits the entire stroke within its sides. If the bounding box of the stroke overlaps a predetermined percentage (or more) of the object, then the stroke is considered to be overlapping the object. A method for selecting an object on a computer screen is described in co-pending patent application Ser. No. 07/888,741, by S. Capps, filed on May 26, 1992, entitled, "Method for Selecting Objects on a Computer Display", which is assigned to the same assignee of the present invention and is hereby incorporated by reference herein. In an alternative embodiment, the stroke is considered to overlap a displayed object if the bounding boxes of the object and the stroke intersect. If the stroke does not overlap an object, then the stroke is assumed not to be a selection gesture, and the process continues to step 82 of FIG. 3. If the stroke does overlap an object, then the CPU assumes that the stroke is a circle-type selection gesture. The process continues to step 78 of FIG. 3 to process the stroke as a circle-type selection gesture.

Figure 5:
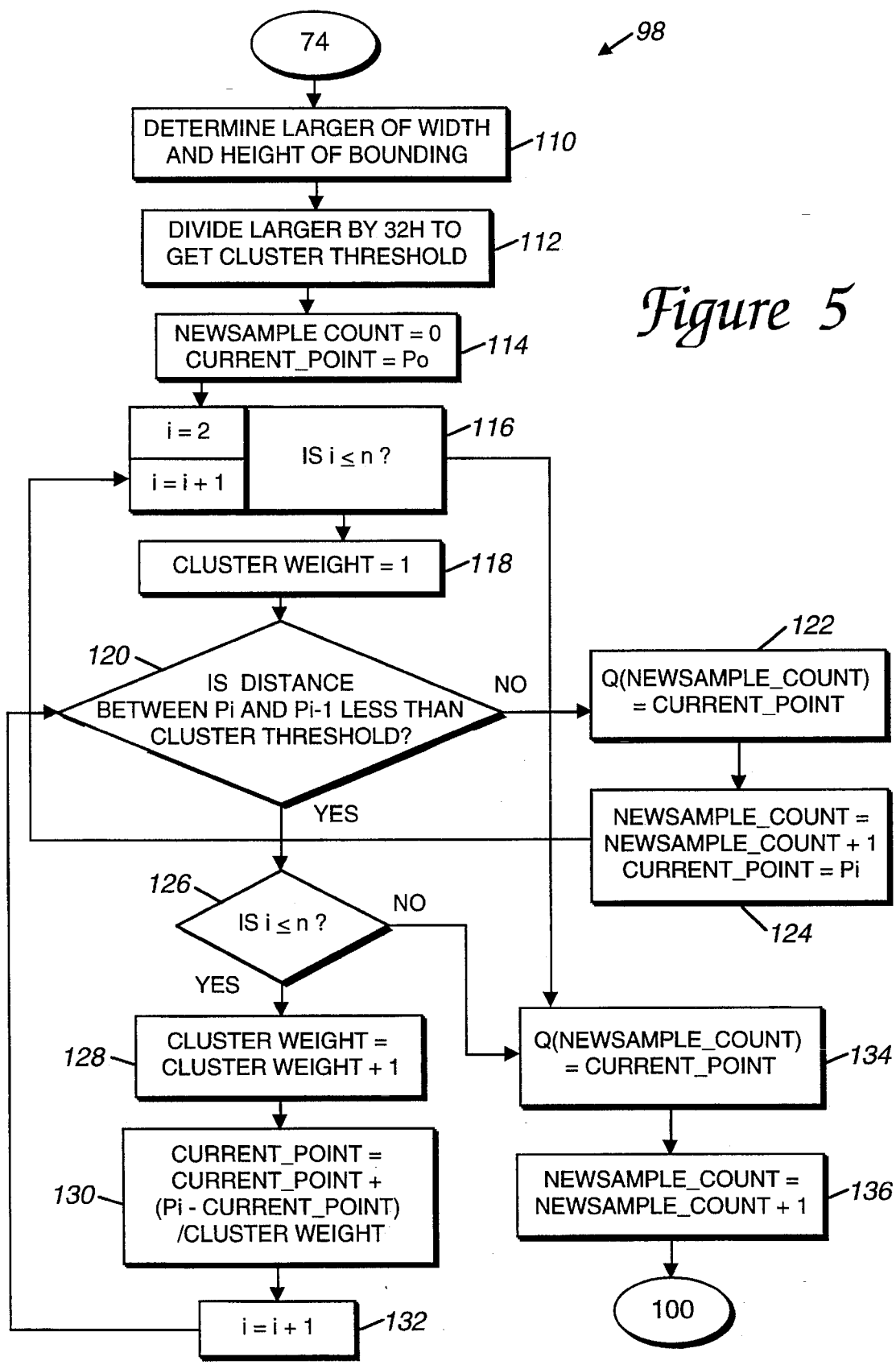
FIG. 5 is a flow diagram illustrating the "Process Stroke to Eliminate Small Segments" step of FIG. 4.

FIG. 5 is a flow diagram 98 of the "Process Stroke to Eliminate Small Segments" step of FIG. 4. Stroke 48 preferably includes a number of points $P_0, P_1, P_2 \ldots P_n$, where each segment of the stroke is defined between two points. The process of FIG. 5 eliminates and recalculates points to smooth the stroke. In a step 110, the CPU determines if the width or the height of the stroke's bounding box is larger. In step 112, the CPU takes the larger side of the stroke's bounding box and divides the size of the larger side by a dividing factor. The result is the "cluster threshold", a value used later in the process. In the described embodiment, the dividing factor has a value of 50 (32 hex). However, the number can be widely varied in accordance with the needs of a particular system, as for example between 40 and 100.

In step 114, the variable NEWSAMPLE_COUNT is set to zero and the variable CURRENT_POINT is set to the first point $P_o$ of stroke 48. In a step 116, a counter variable "i" is set to two and the CPU checks if "i" is less than or equal to "n", where "n" is equal to the number of points in stroke 48 (before the stroke has been smoothed). If "i" is less than "n", then step 118 is implemented. In step 118, the variable CLUSTERWEIGHT is set to 1. In next step 120, the CPU checks if the distance between point $P_i$ and point $P_{i-1}$ is less than the cluster threshold calculated in step 112. If the distance is not less than the cluster threshold, then the two points Pi and Pi−1 of the stroke are far enough apart so that no points need to be eliminated. Step 122 is then implemented, in which a point in the smoothed stroke array Q determined by the value of NEWSAMPLE_COUNT is set to the point stored in CURRENT_POINT. In step 124, the NEWSAMPLE_COUNT variable is incremented by one and CURRENT_POINT is set to $P_i$. The process then loops back to step 116, where the variable "i" is incremented by one. The distance between two points $P_i$ and $P_{i-1}$ is then checked in the same fashion.

If the distance between points $P_i$ and $P_{i-1}$ is determined to be less than the cluster threshold in step 120, then the process continues to step 126. In step 126, the variable "i" is compared to "n", the number of points in the stroke; if "i" is determined to be less than or equal to "n", step 128 is implemented, in which the variable CLUSTERWEIGHT is incremented by one. In the next step 130, the variable CURRENT_POINT is incremented by a value of (point $P_i$−CURRENT_POINT) divided by the value of CLUSTERWEIGHT. This value is the distance between CURRENT_POINT and point Pi divided by the weighted number CLUSTERWEIGHT. Thereafter in step 132, the variable "i" is incremented by one. The process then loops back to step 120, where the points $P_i$ and $P_{i-1}$ are checked if they are too close to each other.

If the variable "i" is not less than or equal to the variable "n" in step 126, then the process continues to step 134. Step 134, and the following step 136, are similar to steps 122 and 124, respectively. Thus, CURRENT_POINT is stored in a location of the Q array determined by the value of NEWSAMPLE_COUNT in step 134. The NEWSAMPLE_COUNT variable is incremented by one, and CURRENT_POINT is set equal to $P_i$ in step 136. After step 136, the process continues to step 100 of FIG. 4.

Figure 5A:
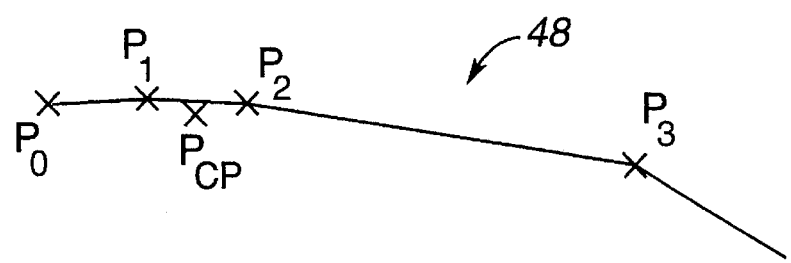
FIG. 5a is portion of a display screen showing part of a stroke and points of the stroke.

The smoothing process described in FIG. 5 briefly functions as follows. If the distance between two adjacent points of the stroke are closer than the cluster threshold, then a new point (CURRENT_POINT) positioned between the points is calculated. As used herein, points "adjacent" to a specific point are points immediately preceding or following that specific point. If a calculated CURRENT_POINT is still within the cluster threshold distance of the next adjacent point, then a new CURRENT_POINT is calculated between the old CURRENT_POINT and the point $P_i$. The new CURRENT_POINT distance from the old CURRENT_POINT is the total distance between the points divided by the CLUSTERWEIGHT. Thus, if there are more than two points all within the cluster threshold distance of each other, the calculated CURRENT_POINT is positioned closer to the larger concentration of points. For example, in FIG. 5a, four points P0, P1, P2, P3 of stroke 48 are all within the cluster threshold distance of their adjacent points. Point $P_0$ is adjacent to point $P_1$, point $P_1$ is adjacent to points $P_0$ and $P_2$, etc. Three of the points $P_0$, $P_1$ and $P_2$ are closer to each other than the focal point $P_3$. The calculated CURRENT_POINT $P_{CP}$ is shown positioned closer to the points $P_0$, $P_1$ and $P_2$ to reflect that more points occurred in that area, i.e. $P_{CP}$ is weighted in the direction towards the three close points. Every two points of the stroke are thus checked to determine whether they are within the cluster threshold distance of each other and, if so, the two points are replaced with a weighted CURRENT_POINT. The points stored in the array Q represent a smoothed stroke: A CURRENT_POINT is stored in the Q array if the point is outside the cluster threshold distance from any adjacent points.

Figure 6:
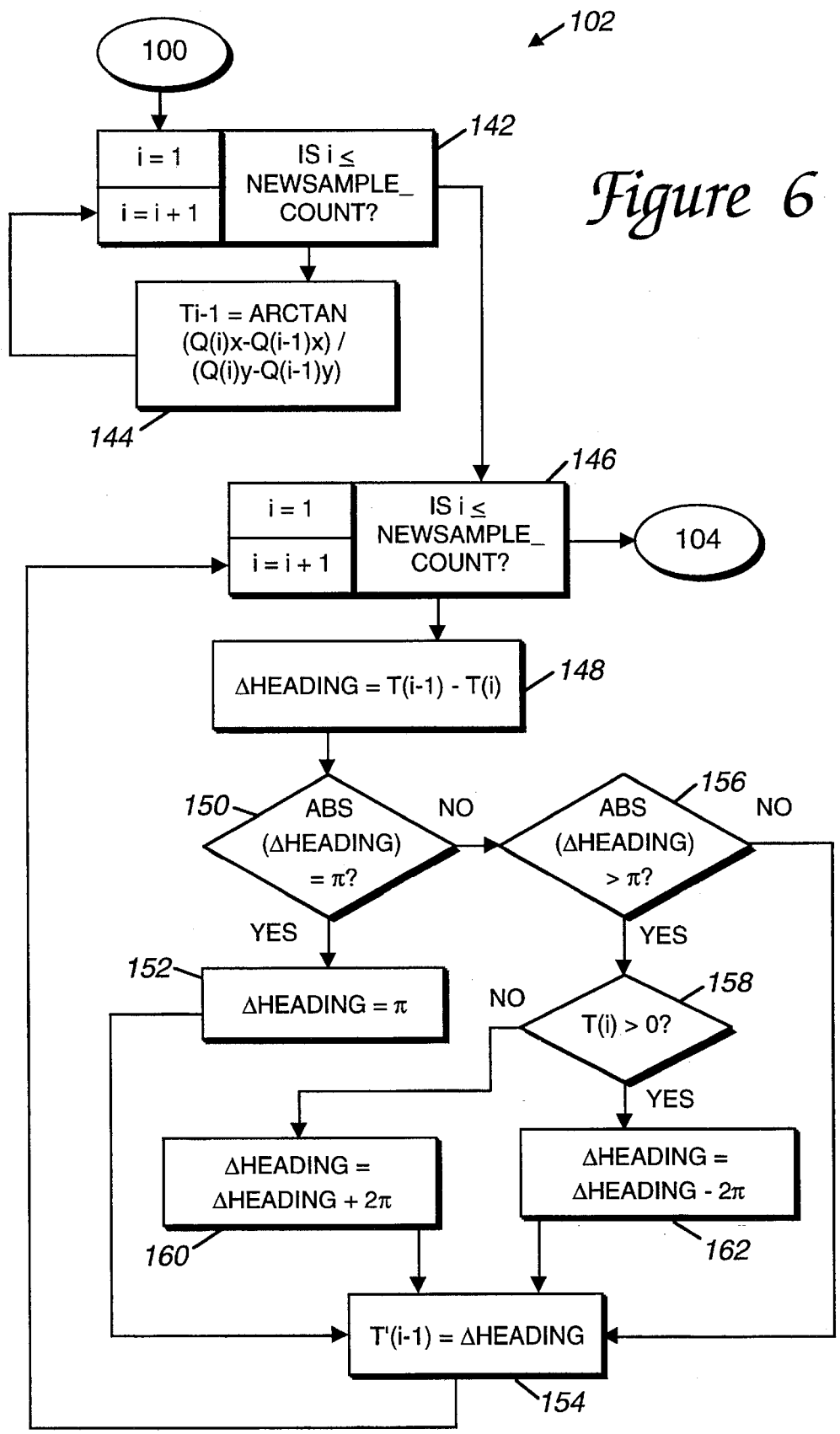
FIG. 6 is a flow diagram illustrating the "Calculate Turn Angles and their Derivatives" step of FIG. 4.

FIG. 6 is a flow diagram of the "Calculate Turn Angles and their Derivatives" step of FIG. 4. In a first step 142, the CPU sets the variable "i" to 1 and checks if "i" is less than or equal to the variable NEWSAMPLE_COUNT. NEWSAMPLE_COUNT is equal to the number of points in the smoothed stroke array Q. If "i" is less than or equal to NEWSAMPLE_COUNT, step 144 is initiated, in which the variable $T_{i-1}$ is set equal to the Arctan of $(Q(i)^x - Q(i-1)^x)/(Q(i)^y - Q(i-1)^y)$. This formula calculates the angle for a segment between two points of the stroke. Once $T_{i-1}$ is calculated, the process loops back to step 142 to increment "i" and calculate the angle $T_{i-1}$ for the next segment of the smoothed stroke in step 144. An array of angles of the smoothed stroke is thus stored in the array T.

Once the angle array T is calculated for all segments of the smoothed stroke, step 146 is initiated. The counter variable i is set to 1 and compared to NEWSAMPLE_COUNT. If i is greater than NEWSAMPLE_COUNT, then step 104 of FIG. 4 is initiated. If the variable "i" is less than or equal to NEWSAMPLE_COUNT, then step 148 is implemented, in which ΔHEADING is set to the difference T(i−1)−T(i). ΔHEADING is thus the difference in angles between two consecutive segments of the smoothed stroke, i.e. the change in heading of the stroke. Step 150 is implemented next, in which the CPU checks if the absolute value of the variable ΔHEADING is equal to pi. If the absolute value of ΔHEADING is equal to pi, ΔHEADING is set to pi in step 152, and T(i−1), the derivative of T(i−1), is set to ΔHEADING in step 154. If the absolute value of ΔHEADING is not equal to pi in step 150, step 156 is initiated, in which the CPU checks if ΔHEADING is greater than pi. If it is not greater than pi, step 154 is initiated. If it is greater than pi, step 158 is implemented, in which the CPU checks if T(i) is greater than zero. If T(i) is not greater than zero, step 160 is implemented, in which $2\pi$ is added to ΔHEADING. If T(i) is greater than zero, step 162 is implemented, in which $2\pi$ is subtracted from ΔHEADING. After step 160 or 162, step 154 is implemented.

Steps 148 through 154 are involved in the process of determining the derivative of each angle calculated in step 144. Array T stores an array of the change in angles between consecutive segments of the smoothed stroke; i.e., ΔHEADING.

Figure 7:
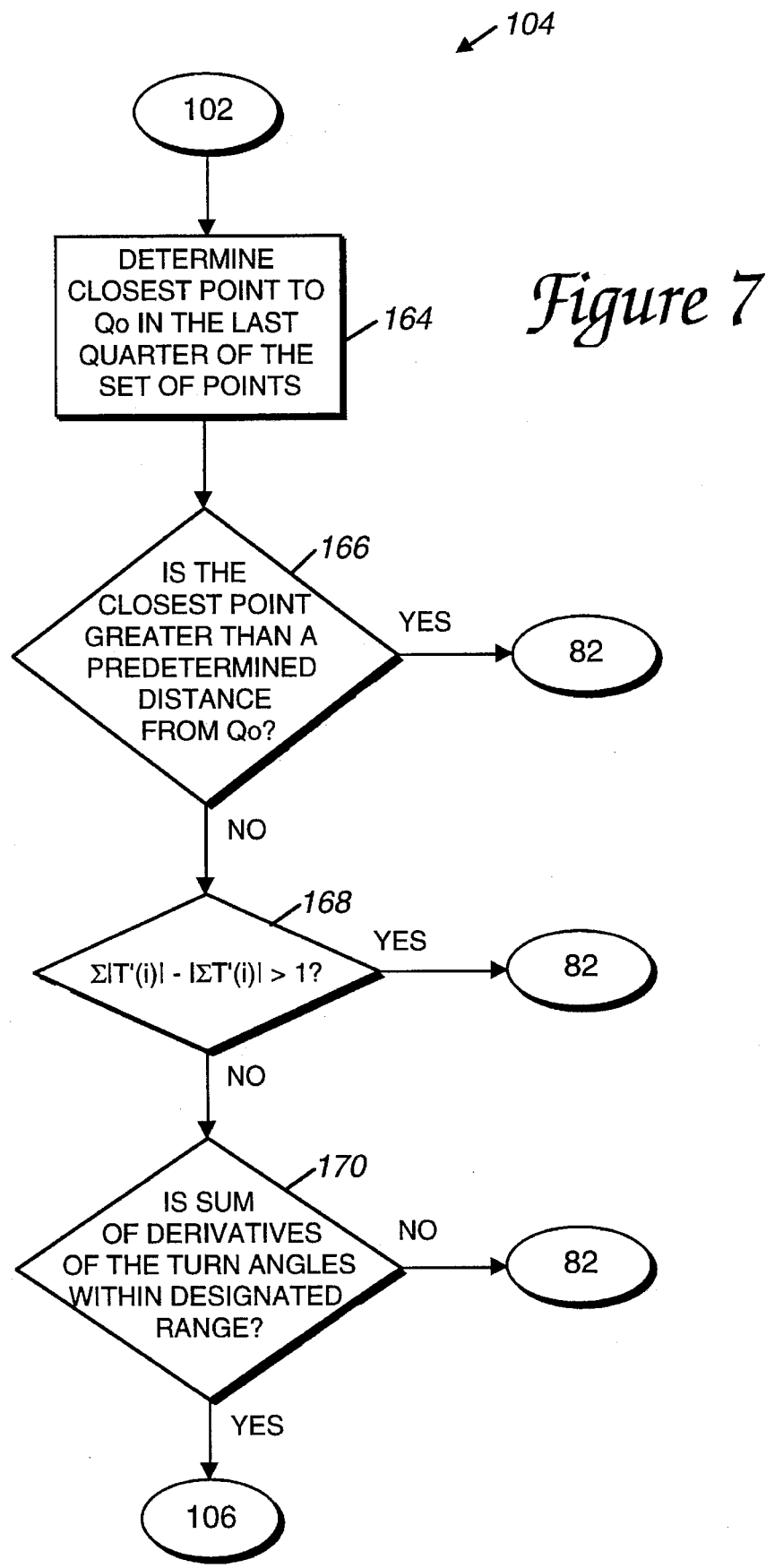
FIG. 7 is a flow diagram illustrating the "Does Stroke Substantially Represent an Ellipse" step of FIG. 4.

FIG. 7 is a flow diagram of the "Does stroke substantially represent an ellipse?" step 104 of FIG. 4. Initially, the logic will determine whether the beginning and end of the stroke are relatively close together (as would be required of a circle-type gesture). More specifically, in a first step 164, the CPU looks at the last 25% of the points in the smoothed stroke array Q and determines which of these points is the closest point to the first point in the smoothed stroke (point Qo). The reason that the closest point in the last section of the stroke is used is to permit a certain degree of sloppiness by the user when drawing the ellipse. More specifically, the user is permitted to "overdraw" the ellipse by a certain amount. Of course, in alternate embodiments, other percentages can be used. For example, the last 30% of points in the stroke can be examined in step 164. The process continues at step 166, where the CPU determines if the closest point found in step 164 is greater than a predetermined distance from the stroke's starting point Qo. In the described embodiment, this predetermined distance is about 16 pixels. If the closest point is located greater than the predetermined distance from Qo, then the stroke is assumed to not represent a circle-type gesture, and the process continues to step 82 of FIG. 3. If the closest point is located within the predetermined distance of Qo, then step 168 is implemented. In alternate embodiments, the value of the predetermined distance could be varied in accordance with the size of the inputted gesture.

In step 168, the absolute value of the sum of the derivatives is subtracted from the sum of the absolute values of the derivatives. If the result of this calculation is greater than 1, then the stroke does not represent a shape that curves substantially in one direction. For example, a "U" shaped stroke would provide a calculated result less than 1 since it curves in one direction. However, an "S"-shaped would provide a calculated result greater than 1 since it curves in more than one direction. If the calculation of step 168 is greater than one, then the stroke does not substantially represent an ellipse, and the process continues to step 82 of FIG. 3. If the calculation of step 168 is less than one, then the process continues at step 170. In step 170, the CPU checks if the sum of derivatives of the turn angles is within a predetermined range to determine if the stroke represents a closed shape. If the sum of derivatives of the turn angles is not within a predetermined range of values, then the process continues to step 82 of FIG. 3. If the sum of derivatives is within the predetermined range of values, then the stroke has a substantially closed shape and is determined to substantially represent an ellipse. Stroke 48 thus is determined to represent a circle-type gesture, and the process continues to step 106 of FIG. 4. In the preferred embodiment, the predetermined range of values is from about 6 to 8.5. In alternate embodiments, this range can vary widely, as, for example, from 4 to 9.

Figure 8A:
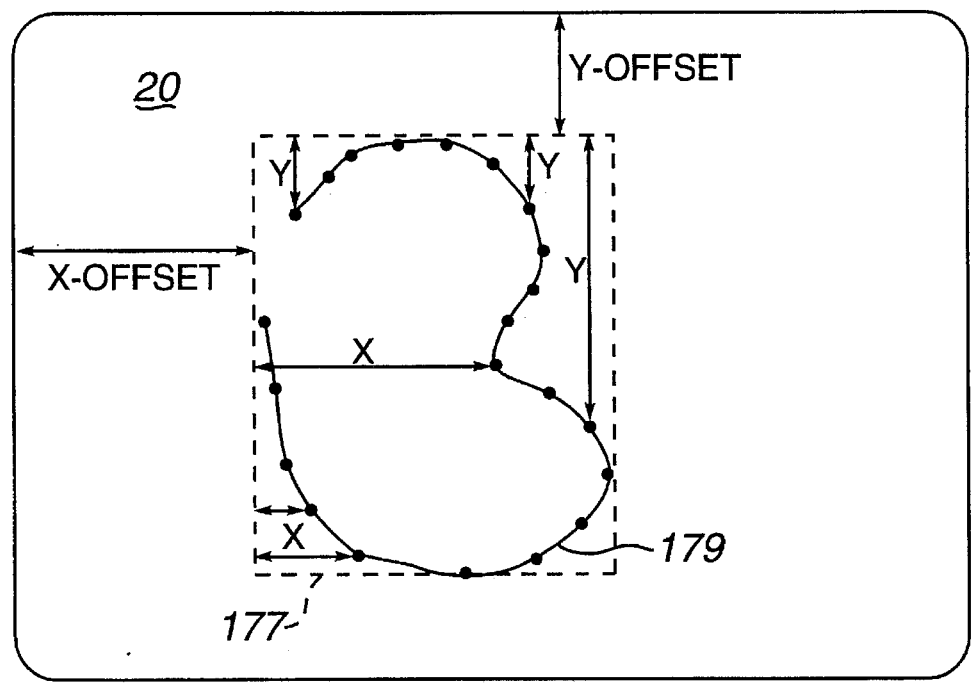
FIG. 8a is a display screen showing a stroke and its coordinates on the screen.
Figure 8:
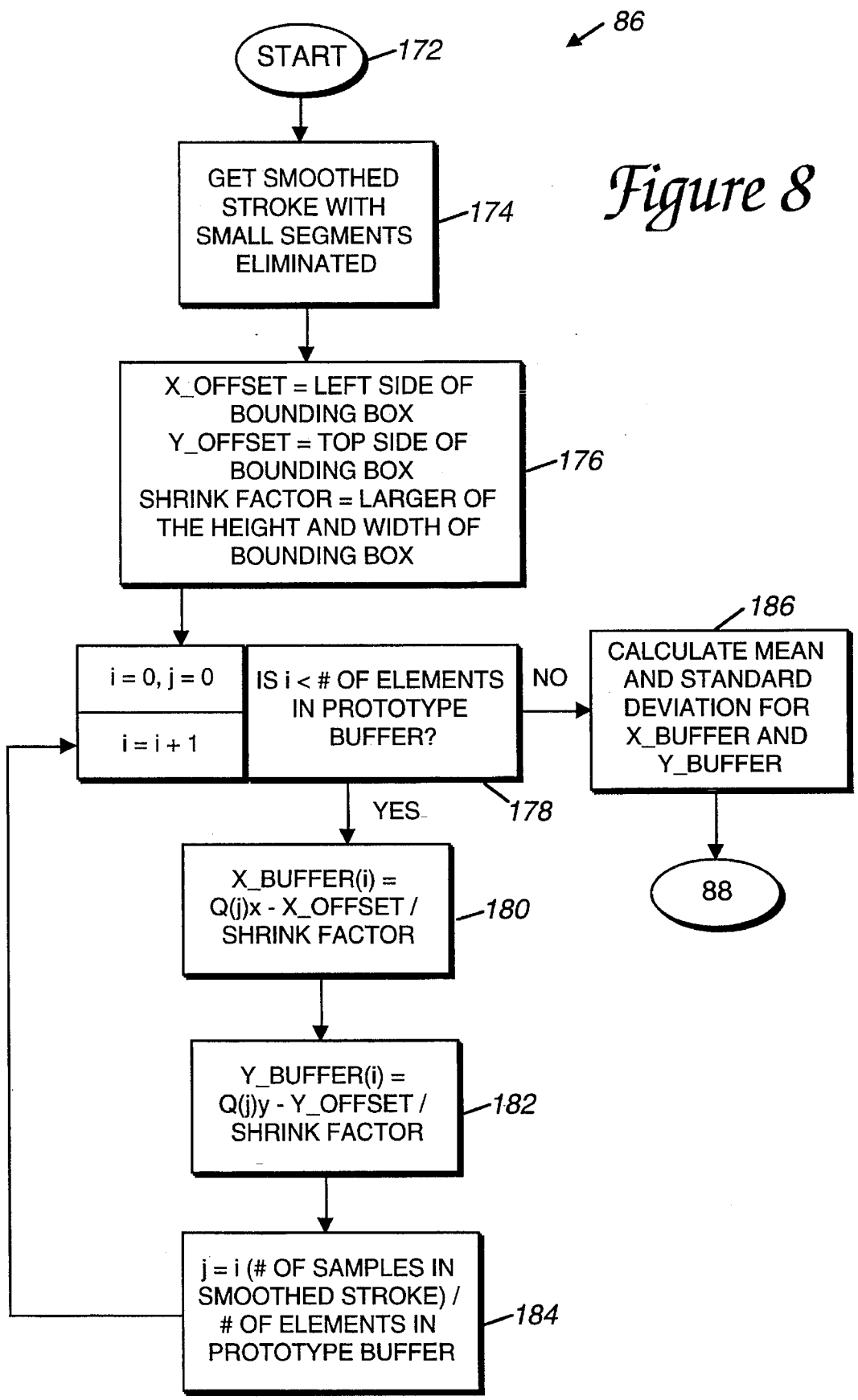
FIG. 8 is a flow diagram illustrating the "Normalize Stroke for Fuzzy Gesture Recognition" step of FIG. 3.

FIG. 8 is a flow diagram 86 of the "Normalize Stroke for Fuzzy Gesture Recognition" step of FIG. 3. The process begins after the algorithmic gesture recognizer does not recognize the input in step 82 of FIG. 3. Beginning at a step 172, the process continues at step 174, where the CPU retrieves the points of the smoothed stroke that were processed for the circle-type gesture recognition, as described with reference to step 98 of FIG. 4. Thus, the smoothed stroke only includes points that are a predetermined distance away from adjacent points. In next step 176, the CPU sets X_OFFSET equal to the x-coordinate, or horizontal coordinate, of the left side of the bounding box of the smoothed stroke. Y_OFFSET is set equal to the y-coordinate, or vertical coordinate, of the top side of the bounding box of the stroke. As shown in FIG. 8a, X_OFFSET and Y_OFFSET are equal to the left and top sides of bounding box 177 of the smoothed stroke 179. The x-coordinates of the points of the smoothed stroke 48 are equal to X_OFFSET plus a small variable amount x, and the y-coordinates of the points of the stroke are equal to Y_OFFSET plus a small variable amount y. The SHRINK FACTOR variable is set equal to the larger of the height and width of the bounding box of the stroke.

In step 178, the variables "i" and "j" are set to zero and the CPU checks if the variable "i" is less than the number of elements in the prototype buffer. The number of elements in the prototype buffer is preferably a predetermined, fixed mount. In the described embodiment, the number of elements is 50. Of course, this number can be varied widely. If "i" is less than the number of elements, then step 180 is implemented. Steps 180 and 182 detail the storage of the stroke into the prototype buffer in normalized form. The prototype buffer includes two individual buffers, the X_BUFFER and the Y_BUFFER, which store the x- and y-coordinates, respectively, of the stroke points. In step 180, X_BUFFER(i) is set equal to (Q(j)x−X_OFFSET)/ SHRINK FACTOR. $Q(j)^x$ is the x-coordinate of the point Q(j), which is a point stored in the stroke array Q. The X_OFFSET is subtracted from the x-coordinate and the result is divided by the shrink factor to normalize the x-coordinate. Thus, the x-coordinate of the point Q(j) is normalized, i.e. it is independent of the location of the stroke on the screen and is converted to a normalized coordinate system. In step 182, Y_BUFFER(i) is set equal to (Q(j)y− Y_OFFSET)/SHRINK FACTOR. Similarly to step 180, the y-coordinate is normalized so that it is independent of the stroke's location on the screen and has a standard size. In step 184, the variable "j" is set equal to i times the number of samples in the smoothed stroke divided by the number of elements in the prototype buffer. The variable "j" is the index of the Q array, and must skip a certain number of points in the Q array so that the stroke can be stored in the fixed-size prototype buffer. For example, if the number of points in the Q array is 500, and the X_BUFFER and Y_BUFFER size is 50, then j=i*500/50=i*10. Thus, every tenth point in the Q array would be stored in the prototype buffer as "i" is incremented.

Once the variable j is calculated, the process loops back to step 178, where "i" is incremented and steps 180 through 184 are again implemented. Once "i" has been incremented so that it is greater than or equal to the number of elements in the prototype buffer, then step 186 is implemented, in which the CPU calculates the mean and standard deviation for the coordinates stored in X_BUFFER and Y_BUFFER. This process is well known to those skilled in the art. The process then continues to step 88 of FIG. 3.

Figure 9:
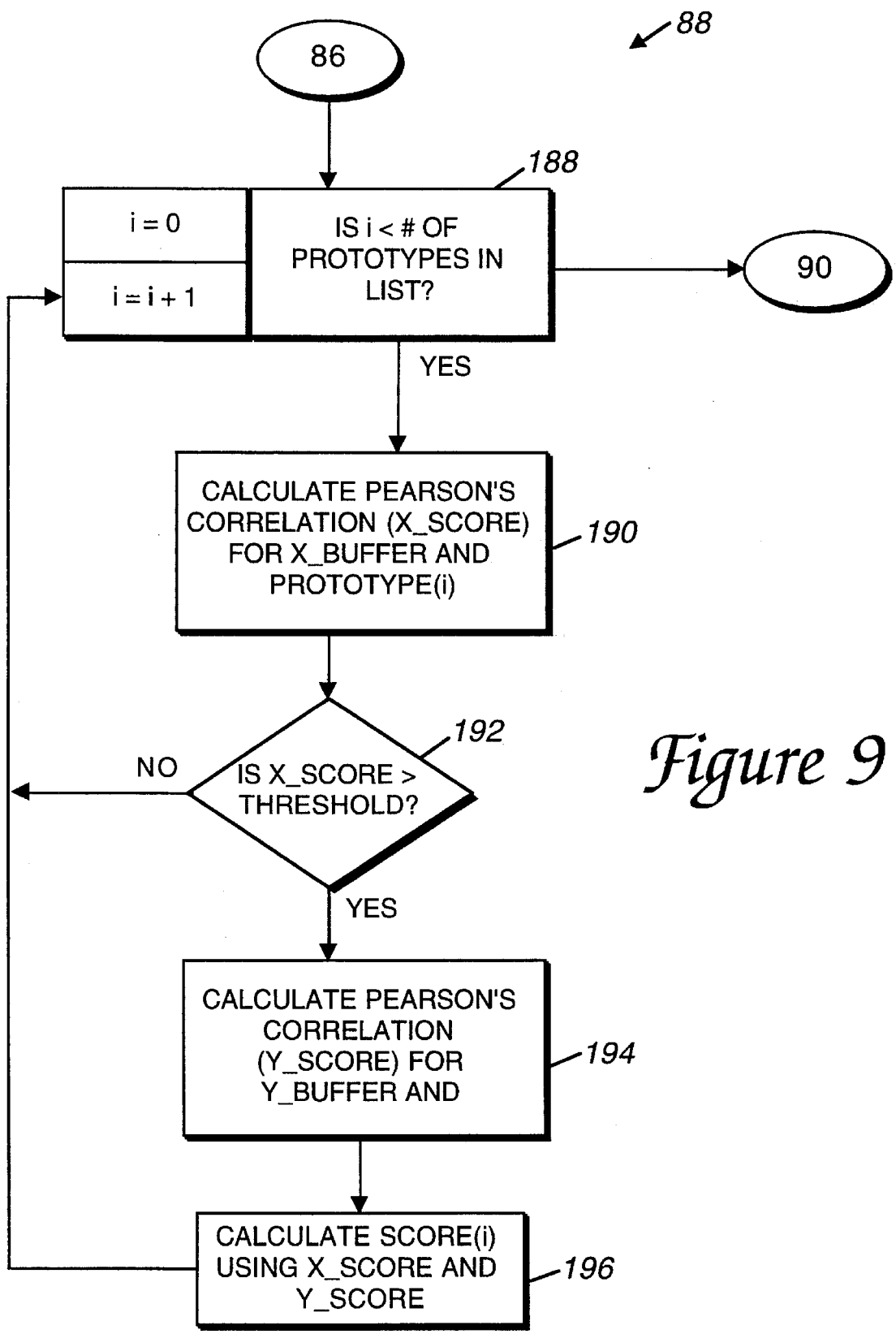
FIG. 9 is a flow diagram illustrating the "Compare Processed Stroke to List of Gesture Prototypes" step of FIG. 3.

FIG. 9 is a flow diagram 88 of the "Compare Processed Stroke to a List of Gesture Prototypes" step of FIG. 3. In step 188, the variable "i" is set to zero, and "i" is compared to the number of gesture prototypes present in the prototype list. The number of gesture prototypes in the list depends on how many standard gesture prototypes are present and how many gesture prototypes have been entered by the user. In the described embodiment, three standard gestures are stored in the gesture prototype list, the left bracket, the right bracket, and the pigtail gestures. These have a conventional gesture shape. The user may also have previously entered customized gesture prototypes that also may be stored in the gesture prototype list. These customized gesture prototypes can be variations of the standard shapes so that a user's personal handwriting will more easily be recognized as a particular gesture; these gestures are described with reference to FIGS. 2c and 2d. To enter customized gesture prototypes, the user would have previously entered a stroke to represent the prototype, and the CPU would have processed the stroke and normalized it to a gesture prototype format. The process of receiving user-specified strokes and gestures, such as gesture prototypes, and storing them in a list in memory is well-known to those skilled in the art. The number of gesture prototypes ultimately depends on the memory space available to store the prototypes.

In step 190, the CPU calculates the Pearson's Correlation for X_BUFFER and PROTOTYPE(i). PROTOTYPE(i) is one of the gesture prototypes in the prototype list, and each PROTOTYPE(i) includes X_BUFFER and Y_BUFFER arrays of the same size as the X_BUFFER and Y_BUFFER arrays calculated for the inputted stroke. Pearson's Correlation is well known to those skilled in the art, and basically states the following:

$$\text{SCORE} = \frac{\sigma_{pq}}{\sqrt{\sigma_{pp}\sigma_{qq}}}, \sigma_{pq} = \sum_{i=0} p_i q_i$$

where, in this case, p is equal to the X_BUFFER array and q is the X_BUFFER array of PROTOTYPE(i). $\sigma_{pq}$ is thus the standard deviation of X_BUFFER and PROTOTYPE(i) combined as shown above, $\sigma_{pq}$ is the standard deviation of X_BUFFER, and $\sigma_{qq}$ is the standard deviation of the X_BUFFER of PROTOTYPE(i). The result of this Pearson's Correlation is X_SCORE, which is a number that indicates how well the X_BUFFER of the normalized stroke matches X_BUFFER of PROTOTYPE(i). In step 192, the CPU checks if X_SCORE is greater than a predetermined threshold number. In the preferred embodiment, the threshold is about 0.65, but in other embodiments this threshold can range from about 0.5 to about 0.8. If X_SCORE is less than or equal to the threshold, then the stroke is assumed not to match PROTOTYPE(i), and the process loops back to step 188 to increment "i" and compare the stroke with the next gesture prototype. If X_SCORE is greater than the threshold, then step 194 is implemented, in which the CPU calculates Pearson's Correlation for Y_BUFFER and the Y_BUFFER array of PROTOTYPE(i). The result of this Pearson's Correlation is Y_SCORE. In next step 196, the CPU calculates a SCORE(i) using the previously calculated X_SCORE and Y_SCORE. SCORE(i) indicates the overall correlation between the normalized stroke and PROTOTYPE(i) and is preferably calculated using the formula:

$$\text{SCORE} = (1 - |x_s - y_s|) \cdot (1 - \sqrt{(1-x_s)^2 - (1-y_s)^2})$$

where $x_s$ and $y_s$ are X_SCORE and Y_SCORE, respectively. SCORE(i) is stored and the process loops back to step 188, where "i" is incremented and steps 190 through 196 are again implemented. Once "i" has been incremented to the number of gesture prototypes in the list, then the correlation process is complete and the recognition process continues to step 90 of FIG. 3.

Figure 10:
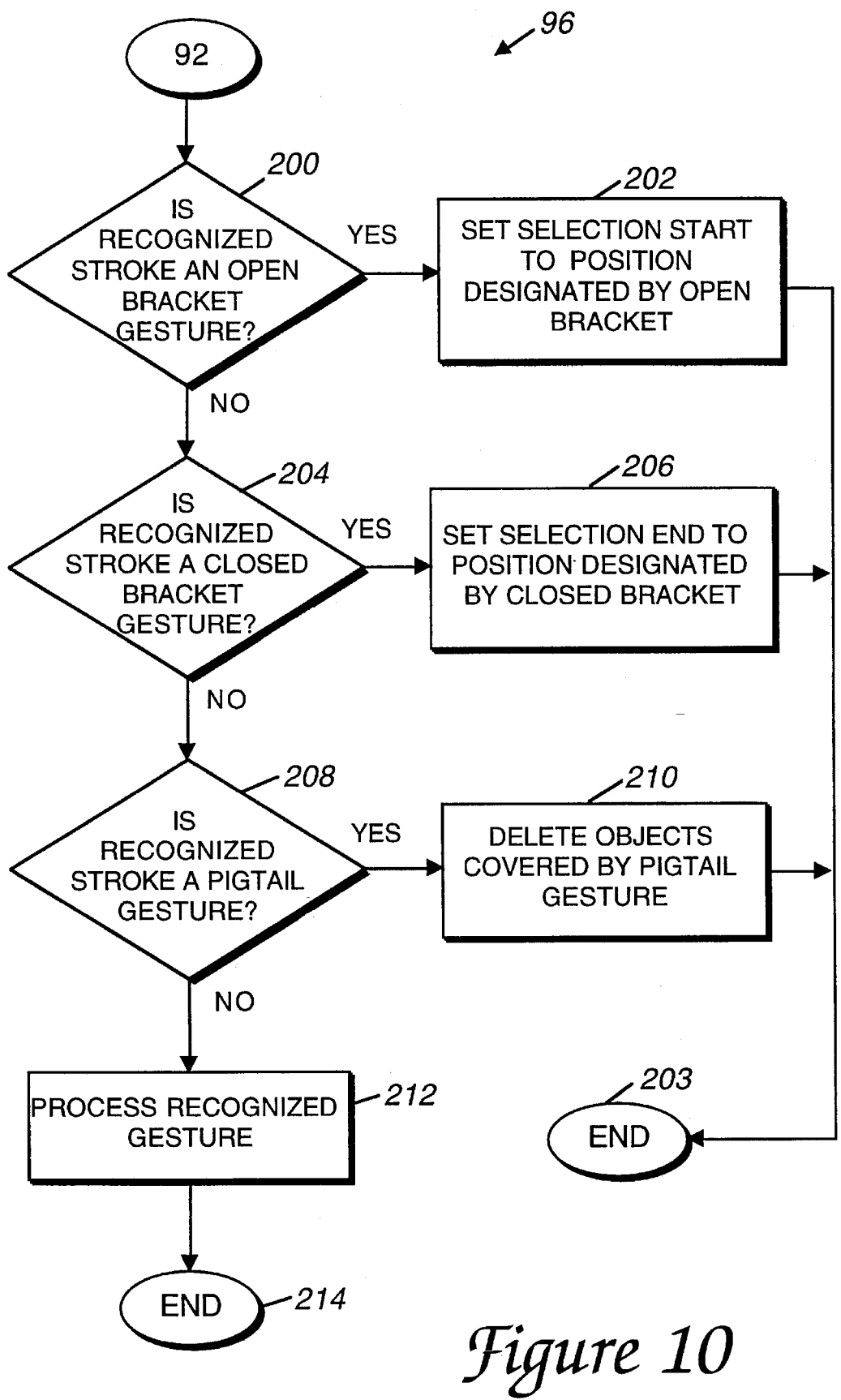
FIG. 10 is a flow diagram illustrating the "Process Stroke as Best Matched Gesture" step of FIG. 3.

FIG. 10 is a flow diagram 96 of the "Process Stroke as Best Matched Gesture" step of FIG. 3. In step 200, the CPU checks if the recognized stroke is an open bracket gesture. This is accomplished by referencing the gesture prototype to which the highest score corresponded. If an open bracket gesture is indicated, then step 202 is implemented, in which a selection start reference is set to the position indicated by the open bracket. If characters are being selected, the selection beginning is referenced at the nearest character position designated by the open bracket. If a corresponding closed bracket has been recognized earlier and it is placed approximately facing the open bracket, then all the objects positioned between the open bracket and the closed bracket are selected. If no closed bracket is recognized, no objects on the screen are selected. After step 202 the process is complete, as indicated in step 203.

If the highest score did not indicate in step 200 that an open bracket was recognized, then step 204 is implemented. In step 204, the CPU checks if the recognized stroke is a closed bracket gesture in a similar fashion as described in step 200. If the stroke is a closed bracket, step 206 is implemented, in which a selection end reference is set to the position indicated by the closed bracket. If characters are being selected, the selection end is referenced at the nearest character position designated by the closed bracket. If a corresponding open bracket has been recognized earlier and if the corresponding open bracket is approximately facing the closed bracket (i.e. the open bracket "opens" toward the close gesture), then all the objects positioned between the open bracket and the closed bracket are selected. The process is then complete as indicated in step 203.

If the highest score did not indicate in step 204 that a closed bracket was recognized, then step 208 is implemented. In step 208, the CPU checks if the recognized stroke is a pigtail gesture. If a pigtail gesture has been recognized, step 210 is implemented, in which objects covered by the pigtail gesture are deleted. As described with reference to FIG. 2e, objects covered by the end of the pigtail gesture or objects covered by the entire pigtail gesture can be deleted. After step 210 the process is complete, as indicated in step 203.

If the highest score did not indicate in step 208 that a pigtail gesture was recognized, then step 212 is implemented. In step 212, the recognized gesture is processed. The recognized gesture could be any gesture that is used on a particular computer system that is not described above. For example, a carat gesture can be used to insert objects or characters within an ink object. After step 212, the process is complete as indicated in step 214.

Figure 11:
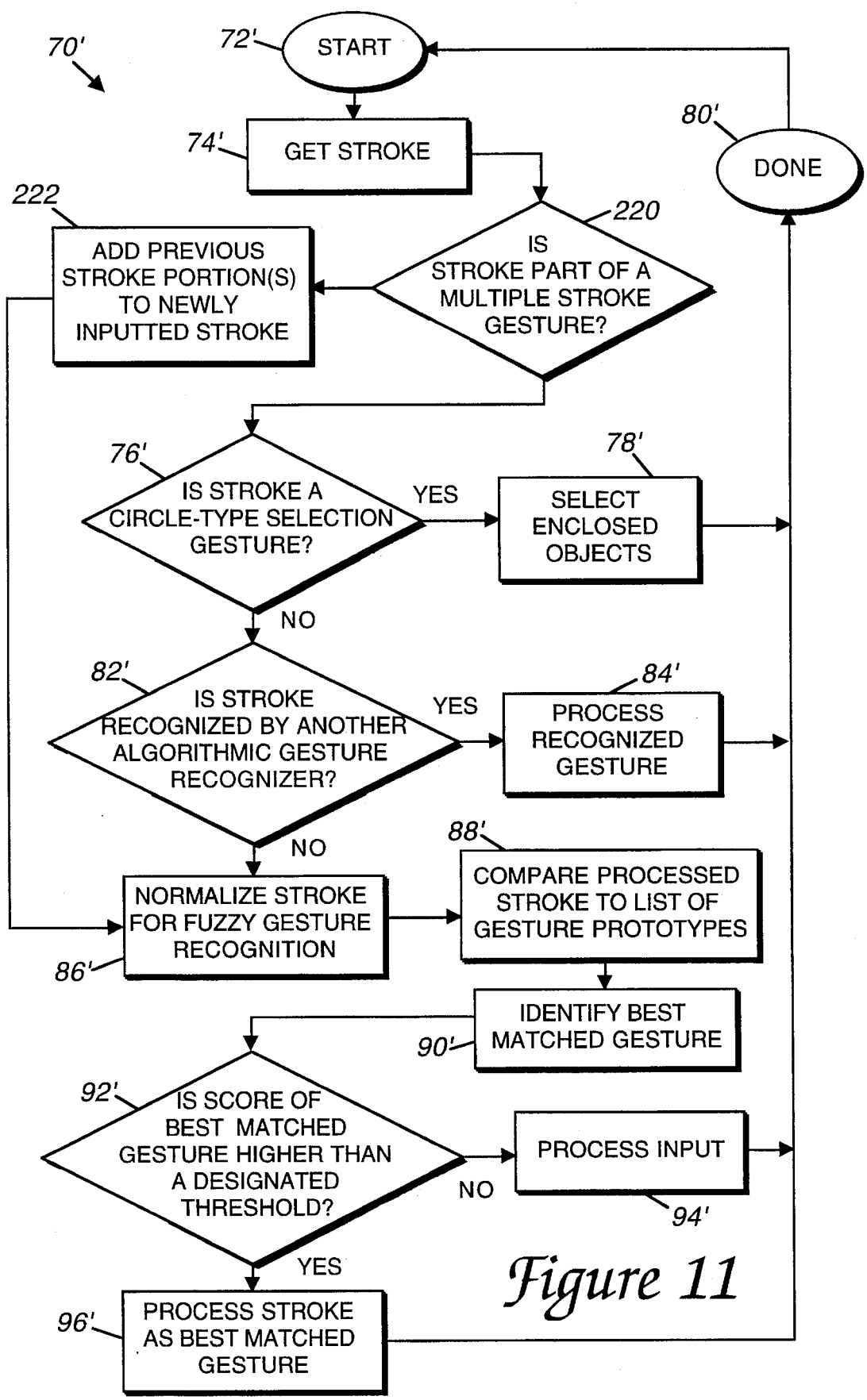
FIG. 11 is a flow diagram illustrating an alternate embodiment of the process shown in FIG. 3.

FIG. 11 is a flow diagram 70' of an alternate embodiment of the process shown in FIG. 3. The process begins at step 72', and, in step 74', the CPU receives a stroke 48 entered by the user. In step 220, the CPU checks if the stroke is part of a multiple stroke gesture. In the preferred embodiment, the CPU determines if the stroke is part of a multiple stroke gesture by checking if an additional stroke is entered within a predetermined distance of the first received stroke and within a predetermined period of time following the entry of the first stroke. For example, a user enters the lower portion of a bracket gesture and enters the upper portion of the bracket as separate strokes. If the upper portion is entered within a predetermined distance from the lower portion and if the upper portion is entered within a certain amount of time following the entry of the lower portion, then the CPU will assume that it is a multiple stroke gesture.

If the stroke is determined to be part of a multiple stroke gesture in step 220, then step 222 is implemented. In step 222, the previously-entered gesture portions of the multiple stroke gesture are added to the newly-inputted stroke. All of the strokes of the gesture are thus combined into a single gesture and are treated henceforth as a single stroke. The CPU assumes that a multiple stroke gesture does not include the circle-type gesture of step 76', and thus the process continues to step 86' and the fizzy gesture recognition steps.

If the stroke is determined not to be a multiple stroke gesture in step 220, then the process continues at step 76' with the circle-type gesture recognition. The remaining steps of flow diagram 70' are similar in function and implementation to the corresponding steps described with reference to FIG. 3.

Although only one embodiment of the present invention has been described in detail, it should be understood that the present invention may be embodied in other specific forms without departing from the spirit or scope of the invention. For example, although one form of the invention has been primarily described with reference to circle-type gestures, it is equally suitable for use with other geometrical shapes. Similarly, other gestures besides the bracket and pigtail gestures described herein may be recognized by the present form of the invention, including letters and other symbols. Further, the described process for correlating a normalized stroke with a gesture prototype is only one of several possible correlation methods. Therefore, the present examples are to be considered as illustrative and not restrictive, and the invention is not to be limited to the details given herein, but may be modified within the scope of the appended claims.

What is claimed is:

1. A method for recognizing a gesture input on a display screen for a computer system, the method comprising the steps of:

receiving a stroke input by a user onto a computer screen, the stroke being represented as a string of points;

smoothing said stroke by reducing the number of points that represent the stroke such that the points of the smoothed stroke are located at least a threshold distance apart from one another;

calculating angles between adjacent segments of said smoothed stroke and calculating derivatives of said angles; and determining whether said stroke substantially represents an ellipse, the ellipse determining step utilizing said angles and said derivatives of said angles to determine whether said stroke substantially curves in one direction or curves in more than one direction, wherein said stroke is not considered to substantially represent an ellipse when said stroke does not curve in one direction, and summing said derivatives of said angles and checking whether said sum is within a predetermined range of values, wherein said stroke is not considered to substantially represent an ellipse when said sum is outside said range of values.

2. A method as recited in claim 1 further comprising the step of determining whether said smoothed stroke includes at least a predetermined minimum number of points and wherein said calculating and ellipse determining steps are only executed when said smoothed stroke includes at least the predetermined number of points.

3. A method as recited in claim 1 wherein said step of smoothing said stroke includes the substeps of:

calculating a position for a new point that is positioned between two adjacent points in the stroke that are separated by less than the threshold distance; and replacing the two adjacent points that are separated by less than the threshold distance with said new point.

4. A method as recited in claim 3 wherein said steps of calculating a position and replacing said two adjacent points with said new point are repeated until all of the remaining points in the stroke are separated by at least the threshold distance.

5. A method as recited in claim 4 wherein the weight given to the location of a specific new point that is to be replaced as part of a subsequent repetition of the new point position calculating and adjacent point replacing substeps is proportional to the number of points that are represented by the specific new point.

6. A method as recited in claim 3 further comprising the steps of:

determining whether an ink object on a computer screen is substantially overlapped by said smoothed stroke; and selecting said ink object when said ink object is overlapped by said smoothed stroke and said smoothed stroke substantially represents an ellipse.

7. A method as recited in claim 6 wherein said stroke and said object each have an associated bounding box, and wherein an object is substantially overlapped by said smoothed stroke when said bounding box of said stroke substantially overlaps said bounding box of said object.

8. A method as recited in claim 1 wherein said step of determining whether the stroke substantially represents an ellipse further includes the substep of determining whether a point on said stroke that is within a predetermined portion including an end point of said stroke is within a predetermined distance of an opposite end point of said stroke, wherein said stroke is not considered to be an ellipse gesture when said point is not within said predetermined distance of said opposite end point.

9. A method as recited in claim 8 wherein the predetermined range of values is about 6 to 8.5.

10. A method as recited in claim 1 further comprising a step of determining whether said stroke is part of a multiple stroke gesture, and adding said stroke to stroke portions previously input when said stroke is part of a multiple stroke gesture.

11. A method of interpreting a gesture input onto a display screen associated with a pen-based computer system, the method comprising the steps of:

detecting a pointer-created stroke input by a user onto the computer screen;

processing the stroke for gesture recognition, the stroke processing step resulting in a series of line segments formed between adjacent points that define the stroke;

calculating the angles formed between adjacent segments of the processed stroke and derivatives of said angles;

determining whether a first selected point within a predetermined portion including an end point of said stroke is within a predetermined distance of a second, opposite end point of said stroke, wherein said stroke is not considered to potentially represent an ellipse-type gesture when said first and second selected points are not within the predetermined distance; and summing all of said derivatives of all of said angles and checking to determine whether the sum is within a predetermined range of values, wherein when the sum is within the predetermined range, the stroke is interpreted to potentially represent an ellipse-type gesture.

12. A method as recited in claim 11 wherein the predetermined range is about 6 to 8.5.

13. A method as recited in claim 11 wherein said first selected point is set to be a first end point of said stroke.

14. A method as recited in claim 13 wherein said second selected point is located within a predetermined portion of a second end of said stroke and is set to be the point in said second end of said stroke that is closest to said first selected point.

15. A method as recited in claim 11 further comprising the step of determining whether said processed stroke includes at least a predetermined minimum number of points and wherein said derivative calculating and summing steps are only executed when said processed stroke includes at least the predetermined number of points.

16. A computer system comprising:

a central processing unit (CPU);

screen means coupled to said CPU;

pointer means coupled to said CPU to provide user inputs which can be displayed on said screen means;

means for receiving a stroke input by a user onto said screen means by said pointer means, the stroke being represented as a string of points;

means for smoothing said stroke by reducing the number of points that represent the stroke such that the points of the smoothed stroke are located at least a threshold distance apart from one another;

means for determining whether said smoothed stroke includes at least a predetermined minimum number of points;

means for calculating angles between adjacent segments of said smoothed stroke and calculating derivatives of said angles; and means for determining whether said stroke substantially represents an ellipse when said angles and said angle derivatives are calculated, the means for determining utilizing said angles and said derivatives of said angles in the determination of whether said stroke substantially represents an ellipse.

17. A computer system as recited in claim 16 wherein said pointer means is selected from the group comprising a stylus, a mouse, and a trackball pointing device.

18. A computer system as recited in claim 17 wherein said screen means and said pointer means are parts of a pen based computer system, and wherein said pointer means includes a stylus and a tablet.

19. A computer system as recited in claim 16 wherein said means for smoothing said stroke includes:

means for calculating a position for a new point that is positioned between two adjacent points in the stroke that are separated by less than the threshold distance; and means for replacing the two adjacent points that are separated by less than the threshold distance with said new point.

20. A computer system as recited in claim 16 wherein said means for determining whether said stroke substantially represents an ellipse includes means for summing said derivatives of said angles and means for checking if said sum is within a predetermined range of values.

21. A computer system as recited in claim 16 further comprising:

means for determining whether an object displayed on said screen means is substantially overlapped by said smoothed stroke; and means for selecting said object when said object is overlapped by said smoothed stroke and said smoothed stroke substantially represents an ellipse.

22. A method for recognizing a gesture input on a display screen for a computer system, the method comprising the steps of:

receiving a stroke input by a user onto a computer screen, the stroke being represented as a string of points;

smoothing said stroke by reducing the number of points that represent the stroke such that the points of the smoothed stroke are located at least a threshold distance apart from one another;

calculating angles between adjacent segments of said smoothed stroke and calculating derivatives of said angles; and determining whether said stroke substantially represents an ellipse, the ellipse determining step utilizing said angles and said derivatives of said angles to determine whether said stroke either substantially curves in one direction or substantially curves in more than one direction, wherein said stroke is not considered to substantially represent an ellipse when said stroke substantially curves in more than one direction.

23. A method as recited in claim 22 wherein said step of determining whether said stroke substantially represents an ellipse includes the steps of:

(a) summing the absolute values of said derivatives of said angles;

(b) taking the absolute value of the sum of said derivatives of said angles; and (c) examining a difference between the results of steps (a) and (b) to determine whether said stroke substantially curves in one direction or substantially curves in more than one direction.

24. A method of interpreting a gesture input onto a display screen associated with a pen-based computer system, the method comprising the steps of:

detecting a pointer-created stroke input by a user onto the computer screen;

processing the stroke for gesture recognition, the stroke processing step resulting in a series of line segments formed between adjacent points that define the stroke;

calculating the angles formed between adjacent segments of the processed stroke and derivatives of said angles;

summing all of said derivatives of all of said angles and checking to determine whether the sum is within a predetermined range of values, wherein when the sum is within the predetermined range, the stroke is interpreted to potentially represent an ellipse-type gesture.

25. A method as recited in claim 24 further comprising the step of determining whether said processed stroke includes at least a predetermined minimum number of points and wherein said derivative calculating and summing steps are only executed when said processed stroke includes at least the predetermined number of points.

26. A method as recited in claim 25 wherein said step of smoothing said stroke includes the substeps of:

calculating a position for a new point that is positioned between two adjacent points in the stroke that are separated by less than the threshold distance; and replacing the two adjacent points that are separated by less than the threshold distance with said new point.

27. A method as recited in claim 24 further comprising the steps of:

determining whether an object displayed on a computer screen is substantially overlapped by said smoothed stroke; and selecting said object when said object is overlapped by said smoothed stroke and said smoothed stroke substantially represents an ellipse.

* * * * *

UNITED STATES PATENT AND TRADEMARK OFFICE
CERTIFICATE OF CORRECTION

PATENT NO. : 5,590,219

DATED : December 31, 1996

INVENTOR(S) : Arnaud P. J. Gourdol

It is certified that error appears in the above-identified patent and that said Letters Patent is hereby corrected as shown below:

Column 5, line 5 please change "frown" to - -from- -.
Column 7, line 52, delete "." after the first occurrence of "step".
Column 8, line 5, change "nornmalized" to - -normalized- -.
Column 12, line 36, change "mount" to - -amount- -.
Column 15, line 20, change "fizzy" to - -fuzzy- -.

Signed and Sealed this

Thirteenth Day of July, 1999

Attest:

Q. TODD DICKINSON

Attesting Officer

Acting Commissioner of Patents and Trademarks